Aug. 1, 1944. P. G. WHITE Re. 22,525

LIMIT SWITCH AND CONTROL SYSTEM COMBINATION

Original Filed Sept. 5, 1942

INVENTOR.
PAUL G. WHITE
BY John H. Leonard & Harold J. Rathbun, Attorneys.

Reissued Aug. 1, 1944

Re. 22,525

UNITED STATES PATENT OFFICE 22,525

LIMIT SWITCH AND CONTROL SYSTEM COMBINATION

Paul G. White, Cleveland, Ohio, assignor to The Electric Controller & Manufacturing Company, Cleveland, Ohio, a corporation of Ohio Original No. 2,328,697, dated September 7, 1943, Serial No. 457,464, September 5, 1942. Application for reissue November 25, 1943, Serial No. 511,745

18 Claims. (Cl. 212—39)

Figure 1:
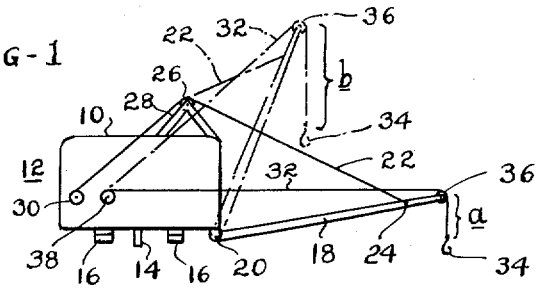

This invention relates to the control of electric motors by limit switches and particularly to control systems for apparatus wherein the extent of operation of one motor driven element must be limited with reference to the position of another element which is independently operated by the same or another motor. The invention is particularly suitable for controlling electrically operated cranes of the boom type, and is hereinafter described as applied to that use.

The hoist motions of electrically operated boom cranes are arranged to be operated by a drum driving means which comprises either a single electric motor or separate motors for each hoist motion. For example, if the driving means comprises two motors, one of the motors drives the winding drum for the boom hoist cable, and the other motor drives the winding drum for the load or hook hoist cable. The boom hoist cable controls the raising and lowering of the boom and extends from the boom hoist winding drum over an idler pulley, mounted above the front end of the crane cab, to its point of attachment near the free end of the boom. The other or fixed end of the boom is pivoted at the bottom of the front end of the crane cab. The boom thus may swing in a vertical plane about its pivot as the boom hoist cable is wound on or unwound from the boom hoist winding drum. The load or hook hoist cable extends from the load or hook hoist winding drum over an idler pulley at the free end of the boom and extends downwardly therefrom to a hook or other suitable device to which a load may be attached.

The crane cab is pivotably supported at a point near its center so as to be rotatable in a horizontal plane. To counterbalance the weight of the boom and the force of the load which is transmitted to the crane cab at the pivot point of the boom, the driving means and winding drums generally are mounted at the rear of the crane cab.

Because of this location of the driving means and drums and the arrangement of the boom hoist cable, hook hoist cable, and boom, each of the cables and the boom swing about a different pivot upon raising and lowering of the boom and consequently a differential in movement for any given points on the boom hoist cable, the hook hoist cable, and the boom results. For example, if the boom is at its uppermost limit and the hook hoist cable is operated so that the hook is slightly below the end of the boom, lowering of the boom causes a take-up in the length of the hook hoist cable between the boom pulley and the hook and jams the hook into the boom pulley. On the other hand, if the boom is horizontal and the hook is drawn to within the usual close distance from the boom pulley and the boom is then raised, there is an excess of hook hoist cable in the raised position of the boom so that the hook is disposed several feet below the end of the boom. If the boom hoist motion has been operated to lower the boom to its lowermost position, and the driving means is operating to raise the hook, automatic means should be provided to stop the driving means before the hook reaches the pulley at the end of the boom. However, if the hook is stopped by the automatic means at its upper limit of travel when the boom is in its lowermost position, raising of the boom without operating the main hoist motion allows the hook to drop farther from the pulley at the end of the boom since the distance from the hook hoist drum to the boom pulley becomes less. Heretofore in the use of such limit switches, a choice had to be made between the danger of jamming the hook into the boom pulley upon lowering of the boom or limiting the maximum height of lift.

Because of these conflicting factors, an ordinary limit switch driven in the usual manner by the load hoist drum and operable automatically to stop the driving means at the upper limit of travel of the hook when the boom is in its lowermost position does not permit the hook to rise to its full limit of travel when the boom is in a raised position. On the other hand, an ordinary limit switch driven in the usual manner by the load hoist drum and adjusted to stop the hook just before it reaches the boom pulley when the boom is in a raised position, does not provide protection against jamming by hoisting of the hook when the boom is in a lower position.

One of the objects of the present invention is to eliminate both of these difficulties and make it possible to operate a boom crane without danger of jamming the hook and the boom pulley regardless of the position of the boom and without limiting the maximum lifting height of the crane in any manner other than by the length of the boom itself.

In accordance with the present invention, an ordinary and common limit switch of the rotatable type is driven through a differential gear by both the boom hoist and the hook hoist drums. The apparatus is so arranged that the limit switch is driven in one direction during hoisting of the hook or lowering of the boom and is driven in the opposite direction during lowering of the hook or raising of the boom. Consequently, the operation of the limit switch is compensated for boom position. A limit switch means is thus provided which permits the hook to approach as closely to the boom pulley as is safe, but which, in accordance with the exemplary showing herein, has contacts which stop the load hoist motor when the hook approaches too closely to the boom regardless of the position of the boom and which stop the boom hoist motor when the boom is lowered to a position where the boom pulley is approaching too close to the hook. The limit switch contacts also prevent raising of the hook or lowering of the boom while the hook and boom pulley are too close together.

An object of this invention is to provide a simplified limit switch control for controlling the operation of independently driven elements in accordance with their relative positions.

Another object is to provide a differentially operated limit switch means for preventing independently driven elements from approaching too close to each other.

A further object is to provide a driving system for a rotatably driven limit switch of the usual and common type so that the limit switch is operable to stop independently driven elements in predetermined relation to each other.

A more specific object is to provide an improved limit switch control system for a boom crane.

Another specific object is to provide an overhoist limit switch control system for a boom crane which is compensated for boom position.

A further specific object is to provide a limit switch control system for a boom crane which effects stopping of the boom hoist motor if the boom is lowered within a predetermined distance from the hook and which, regardless of the position of the boom, effects stopping of the hook hoist motor if the hook is raised within said predetermined distance from the boom.

Figure 2:
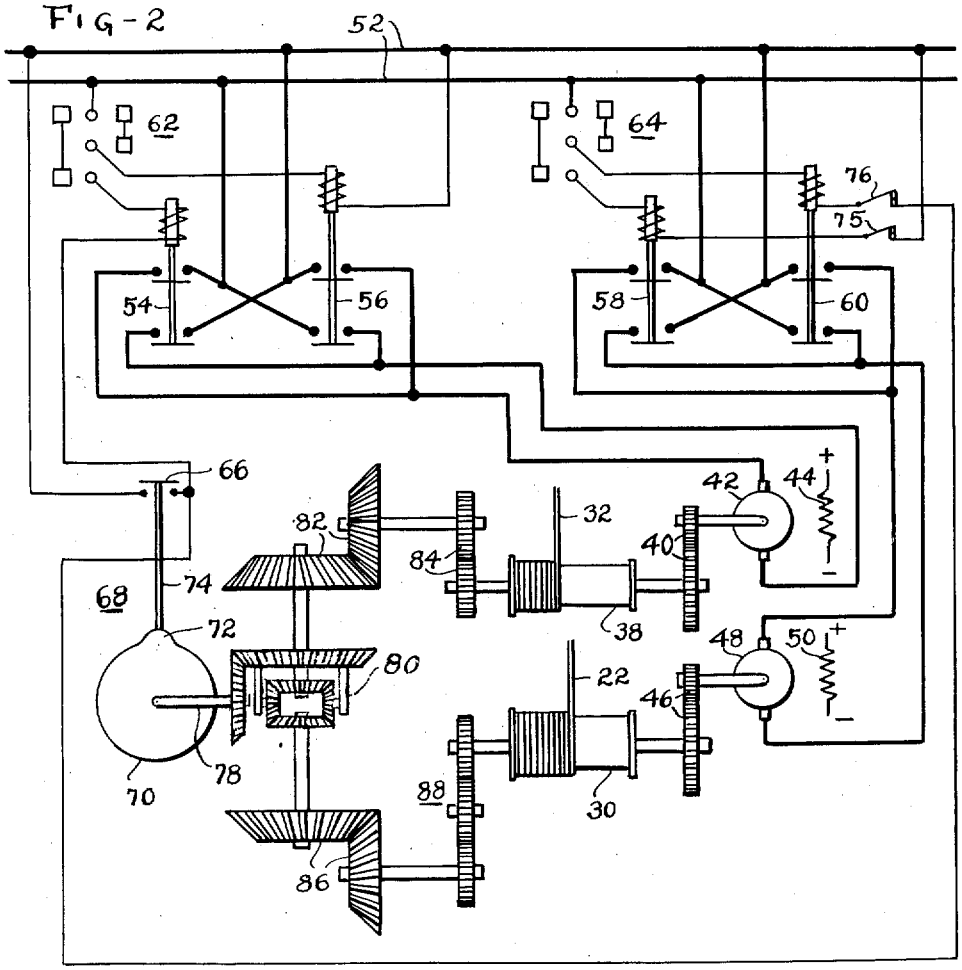

Other objects and advantages will become apparent from the following specification wherein reference is made to the drawing, in which Fig. 1 is a diagrammatic representation of a boom crane of the type to which this invention may be applied, and Fig. 2 is a very much simplified wiring diagram and diagrammatic representation of the apparatus of this invention in one form.

Referring to Fig. 1, a cab 10 of a boom crane 12 is provided with a downwardly extending pivot pin 14 and suitable rollers 16 so that the cab 10 can be centrally supported for rotation in a horizontal plane about a point near its center. A boom 18 has its fixed end pivoted at 20 near the lower front or right hand end of the cab 10 so that the boom 18 may be raised and lowered in a vertical plane and rotation of the cab 10 about the support for the pivot pin 14 may swing the boom 18 horizontally.

A boom hoist cable 22 for controllng the raising and lowering of the boom 18 has one end attached near the free end of the boom 18 at 24 and extends to a boom hoist winding drum 30 over an idler pulley 26 supported by a framework 28 extending upwardly from the front end of the cab 10. The cable 22 is wound on the boom winding drum 30 which is mounted in the rear or left hand end of the cab 10. A load or hook hoist cable 32 has a suitable load attaching device such as a hook 34 fastened to one end and passes over a boom pulley 36 at the free end of the boom 18 to a load or hook hoist winding drum 38 mounted in front of the drum 30 near the rear end of the cab 10. The winding drums 30 and 38 and the driving motors therefor are mounted in the rear end of the cab 10 to act as a counterbalance for the weight of the boom 18 and the load being lifted. The boom 18 and the cables 22 and 32 are shown in solid lines to indicate their respective positions when the boom 18 is in the lowermost position and are shown in broken lines to indicate their respective positions when the boom 18 is in the uppermost position.

Referring to Fig. 2, the hook hoist drum 38 is arranged to be driven through suitable gearing 40 by a direct current motor 42 having a suitable energized field winding 44. The boom hoist drum 30 is arranged to be driven through suitable gearing 46 by a direct current motor 48 having a suitable energized field winding 50. Reversible power for the armature winding of the motor 42 is obtained from a suitable direct current source 52 through electromagnetic reversing switches 54 and 56. Reversible power for the armature winding of the motor 48 is obtained from the source 52 through electromagnetic reversing switches 58 and 60. The operation of the switches 54 and 56 is controlled by a master controller 62 and the operation of the switches 58 and 60 is controlled by a master controller 64. The controllers 62 and 64 are shown in their off positions. Power for operating the switches 54, 56, 58 and 60 is obtained from the source 52. Although direct current motors have been illustrated, it is obvious that the invention may be used with alternating current motors as well.

Movement of the controller 62 to the right from its off position normally energizes the switch 54 which when energized operates to connect the motor 42 to the source 52 for driving the hook hoist drum 38 in the direction causing hoisting of the hook 34, and movement of the controller 62 to the left from its off position energizes the switch 56 which when energized operates to connect the motor 42 to the source 52 for driving the hook hoist drum 38 in the direction causing lowering of the hook 34. Likewise, movement of the controller 64 to the right from its off position normally energizes the switch 58 which when energized operates to connect the motor 48 to the source 52 for driving the boom hoist drum 30 in the direction causing raising of the boom 18, and movement of the controller 64 to the left from its off position normally energizes the switch 60 which when energized operates to connect the motor 48 to the source 52 for driving the boom hoist drum 30 in the direction causing lowering of the boom 18.

The switch 56 may be energized at any time upon movement of the controller 62 to the left, but the switches 54, 58, and 60 are energized upon movement of their associated controllers 62 or 64 only if certain limit switches now to be described are in the proper positions. The energizing circuit for the switch 54 can be completed only when contacts 66 of a suitable rotatable type limit switch, such as a cam limit switch 68, are closed. The limit switch 68 also comprises a rotatable circular cam 70 having a projecting portion 72 which cooperates with a pusher rod 74 to open and close the contacts 66 depending upon the rotated position of the cam 70. The energizing circuit for the switch 58 can only be completed when limit switch contacts 75 are closed. The limit switch contacts 75 are closed when the boom 18 is below its upper safe limit of travel and are open only when the boom 18 is at its upper safe limit of travel. The energizing circuit for the switch 60 can only be completed when contacts 76 and 66 are closed. The contacts 76 are closed when the boom 18 is above its lowermost safe limit of travel and are open only when the boom 18 is at its lower safe limit of travel. The contacts 75 and 76 may be parts of a hatchway type limit switch such as is commonly used on boom cranes to limit the extent of travel of the boom 18 independently of the position of the hook 34.

The cam 70 is arranged to be rotatably driven by a driven shaft 78 of a standard differential gear 80. One driving element of the differential 80 is driven by the hook hoist drum 38 through bevel gears 82 and gearing 84. The other driving element of the differential 80 is driven by the boom hoist drum 38 through bevel gears 86 and reversing gearing 88.

When the hook 34 is as close to the boom pulley 36 as possible for maximum safe height of lift and the boom 18 is in its lowermost position, the cam 70 is adjusted on the shaft 78 so that the raised portion 72 engages the rod 74 to hold the contacts 66 open, as shown in Fig. 2. With the limit switch 68 in the open position the motor 42 cannot be energized to raise the hook 34 and the motor 48 cannot be energized to lower the boom 18 due to the open contacts 66 in the energizing circuits for the switches 54 and 60.

Assume that the boom 18 is in its lowermost position and that the hook 34 has been raised to its upper limit leaving the length *a* (Fig. 1) of the cable 32 between the hook 34 and the pulley 36. Movement of the controller 64 to the left does not cause energization of the switch 60 because the contacts 66 and 76 are open, and movement of the controller 62 to the right does not cause energization of the switch 54 because the contacts 66 are open. Movement of the controller 64 to the right, however, causes energization of the switch 58 which operates to cause the motor 48 to drive the boom hoist drum 30 in the direction which raises the boom 18. Movement of the boom 18 from its lowermost position effects closure of the contacts 76 in a well known manner. Rotation of the drum 30 in the direction which raises the boom 18 drives the differential 80 in a direction to cause the cam 70 to rotate counterclockwise, and when the portion 72 passes from beneath the rod 74, the contacts 66 close. When the boom 18 reaches its upper limit as shown by the dotted lines in Fig. 1, the contacts 75 open to deenergize the switch 58 which opens to stop the boom hoist motor 48. Due to the geometric configuration of the cables 22 and 32 and the boom 18, the length of the cable 32 between the hook 34 and the pulley 36 has increased from the length *a* to the length indicated by *b* as a result of raising the boom 18. However, closure of the contacts 66 upon raising of the boom 18 permits further hoisting of the hook 34 so that the increase in the length of the cable 32 between the boom pulley 36 and the hook 34 may be taken up by further hoisting of the hook 34.

For example, at any time after the contacts 66 close, the movement of the controller 62 to the right causes operation of the switch 54 to energize the motor 42 to drive the drum 32 in a direction to hoist the hook 34. Rotation of the drum 32 in a direction to hoist the hook 34 drives the cam 70 through the differential 80 in a clockwise direction, and, if the hook 34 overtakes the boom 18, the projecting portion 72 of the cam 70 again strikes the rod 74 to open the contacts 66 to stop the motor 42 and prevent the starting of the motor 48. The hook 34 is thus automatically prevented from approaching within a predetermined distance from the boom pulley 36 regardless of the position of the boom 18, and may be hoisted to its maximum safe height while the boom 18 is in a raised position.

At any time that the hook 34 and boom pulley 36 are far enough apart for the contacts 66 to be closed and the boom 18 is not in its lowermost position determined by the contacts 76, movement of the controller 64 to the left causes energization of the switch 60 which when energized closes to cause the boom hoist motor 48 to drive the boom hoist drum 30 in a direction to lower the boom 18, and the cam 70 is driven in a clockwise direction. The boom 18 may continue to lower until the boom pulley 36 nears the hook 34 at which time the projecting portion 72 of the cam 70 lifts the rod 74 to open the contacts 66 or until the boom 18 reaches its lowermost position and opens the contacts 76.

Likewise, if the hook 34 and boom pulley 36 are far enough apart for the contacts 66 to be closed, movement of the controller 62 to the right causes energization of the switch 54 which operates to cause energization of the motor 42 so that the hook hoist drum 38 is driven in a direction to hoist the hook 34. The drum 38 when hoisting the hook 34 drives the cam 70 in a clockwise direction to move the projecting portion 72 toward the rod 74. When the hook 34 again approaches the boom pulley 36, the projecting portion 72 moves the rod 74 upward to open the contacts 66. Opening of the contacts 66 deenergizes the switch 54 which thereupon opens to deenergize the motor 42 and prevent the reclosure of the switch 60 so that the boom 18 cannot be lowered.

The hook 34 may be lowered at any time regardless of the position of the boom 18 by moving the controller 62 to the right to energize the switch 56 which, when energized, connects the motor 42 so as to drive the drum 38 in a direction to lower the hook 34. When rotating in this direction, the drum 30 drives the cam 70 through the differential 80 in a counterclockwise direction so that the projecting portion 72 moves to the left away from the rod 74. There is no limit to the extent of lowering of the hook provided by the limit switch 68 since it is assumed that all of the main hoist cable will be paid out before the cam 70 has made a complete revolution.

The differential connection between the drums 30 and 38 and the limit switch 68 compensates the limit switch 68 for the position of the boom 18. The accuracy of the limit switch compensation provided depends somewhat upon the geometric configuration of the pivot point 20, point of cable attachment 24 on the boom 18, pulleys 36 and 26, and the drums 30 and 38. Suitable gear ratios may be selected to insure that the accuracy of compensation is adequate for any particular installation.

The control system for the motors 42 and 48 has been shown greatly simplified for ease of understanding of the present invention. It is understood that actual control systems would be much more complicated including among other things acceleration resistance control and dynamic braking or other electrical braking connections.

I claim:

1. In a control system for separately operable reversible motors arranged to drive separately operable elements, respectively, and means for controlling the direction of rotation of said motors, a differentially operated limit switch means for the motors and driven differentially in response to the operated positions of said operable elements, said limit switch means having contact means for controlling the energization of said motors for one direction of rotation, said contact means permitting unlimited rotation of said motors in the opposite direction.

2. In a control system for separately operable reversible motors arranged to drive separately operable elements, respectively, and means for controlling the direction of rotation of said motors, said elements being selectively movable away from and toward each other depending upon the direction of rotation of said motors, a differentially operated limit switch means for the motors and driven differentially in response to the movements of said operable elements, said limit switch means having contacts operable for controlling the energization of said motors when said motors are driving said operable elements toward each other.

3. A control system for separately operable reversible motors arranged to drive separately operable elements, respectively, comprising energizing circuits for said motors, respectively, means associated with said energizing circuits for controlling the direction of rotation of said motors, a differential gear having driving elements and a common driven element, means operatively connecting the driving elements of said differential gear to said operable elements, respectively, for driving said driving elements in a fixed relation to said operable elements, respectively, a limit switch means operatively connected to the driven element of said differential gear and driven thereby, and said limit switch means being operatively associated with said energizing circuits to control limits of relative positions of said operable elements by control of the energization of the motors.

4. A control system for separately operable motors arranged to drive separately operable elements, respectively, comprising reversing switching means for controlling the energization of said motors, a differential gear having driving elements and a common driven element, means operatively connecting the driving elements of said differential gear to said operable elements, respectively, for driving said driving elements in a fixed relation to said operable elements, respectively, a limit switch operatively connected to the driven element of said differential gear and driven thereby, and said limit switch being operatively associated with said switching means to control limits of relative positions of said operable elements by control of the energization of the motors.

5. In a boom hoist, a boom, a boom hoist mechanism connected thereto for hoisting and lowering of the boom, an independently operable load hoist drum, a load hoist cable connected thereto for hoisting and lowering of a load independently of the boom, independently operable motors for said boom hoist mechanism and said load hoist drum, respectively, a differentially operable limit switch means for the motors and driven differentially in response to the operated positions of the boom and the load hoist cable for maintaining predetermined limits of relative positions of the boom and the load hoist cable.

6. In a boom hoist, a boom hoist drum, a boom hoist cable connected thereto for hoisting and lowering of the boom, an independently operable load hoist drum and a load hoist cable connected thereto for hoisting and lowering of a load independently of the boom, independently operable motors for said drums, respectively, and a differentially operable limit switch means for the motor and driven differentially in response to the operated positions of the boom and load hoist cables for maintaining predetermined limits of relative positions of the boom and load hoist cables.

7. In a boom hoist, a boom hoist drum, a boom hoist cable connected thereto for hoisting and lowering of the boom, an independently operable load hoist drum, a load hoist cable connected thereto for hoisting and lowering of a load independently of the boom, independently operable motors for said drums, respectively, a limit switch for controlling the operation of one of said motors to limit the range of operation of said boom hoist drum, and a differentially operable limit switch means for the motors and driven differentially in response to the operated positions of the boom and load hoist cables for maintaining predetermined limits of relative positions of the boom and load hoist cables.

8. In a boom hoist, a boom, a boom hoist mechanism connected thereto for hoisting and lowering of the boom, an independently operable load hoist drum, a load hoist cable connected thereto for hoisting and lowering of a load independently of the boom, independently operable motors for said boom hoist mechanism and said load hoist drum, respectively, a differential mechanism having a plurality of driving elements and a common driven element, means for driving said driving elements in fixed relation to the operation of the boom and the load hoist cable, respectively, and limit switch means for the motors driven by said common driven element of said differential mechanism for maintaining predetermined limits of relative positions of the boom and the load hoist cables.

9. In a boom hoist, a boom, a boom hoist drum, a boom hoist cable connected thereto for hoisting and lowering of said boom, a load attaching device, an independently operable load hoist drum, a load hoist cable connected to said load hoist drum and said load attaching device and associated with said boom for hoisting and lowering of said load attaching device independently of the boom, independently operable reversible motors for said drums, respectively, a differential mechanism having a plurality of driving elements and a common driven element, means for driving said driving elements in fixed relation to the operation of the boom and load hoist drums, respectively, and limit switch means for the motors and driven by said common driven element of said differential mechanism, said limit switch means including contacts for controlling the operation of said motors to maintain a predetermined minimum distance between said boom and said load attaching device regardless of the hoisted position of said boom.

10. The combination with a boom crane having a plurality of separately operable hoisting mechanisms driven by an electrically controlled driving means and an electric circuit for controlling the driving means, of a limit switch means operatively in said electric circuit and driven differentially by said mechanisms for controlling said driving means.

11. The combination with a boom crane having a plurality of separately operable hoisting mechanisms, a driving means therefor, and an electrical control system including a limit switch for controlling said driving means, of a differential mechanism for driving said limit switch in accordance with the operation of said hoisting mechanisms.

12. In a boom hoist, a boom, a boom hoist mechanism connected thereto for hoisting and lowering of the boom, an independently operable load hoist drum, a load hoist cable connected thereto for hoisting and lowering of a load independently of the boom, an electrically operated driving means for said boom hoist mechanism and said load hoist drum, a differentially operable limit switch means for said driving means and driven differentially in response to the operated positions of the boom and the load hoist cable for maintaining predetermined limits of relative positions of the boom and the load hoist cables.

13. In a boom hoist, a boom hoist drum, a boom hoist cable connected thereto for hoisting and lowering of a boom, an independently operable load hoist drum, a load hoist cable connected thereto for hoisting and lowering of a load independently of the boom, an electrical driving means for said drums, a limit switch for controlling the operation of said boom hoist drum, and a differentially operable limit switch means for said driving means and driven differentially in response to the operated positions of the boom and load hoist cables for maintaining predetermined limits of relative positions of the boom and load hoist cables.

14. In a boom hoist, a boom, a boom hoist mechanism connected thereto for hoisting and lowering of the boom, an independently operable load hoist drum, a load hoist cable connected thereto for hoisting and lowering of a load independently of the boom, an electrical driving means for said boom hoist mechanism and said load hoist drum, a differential mechanism having a plurality of driving elements and a common driven element, means for driving said driving elements in fixed relation to the operation of the boom and the load hoist cables, respectively, and limit switch means for the driving means driven by said common driven element of said differential mechanism for maintaining predetermined limits of relative positions of the boom and the load hoist cables.

15. In a boom hoist, a boom, a boom hoist drum, a boom hoist cable connected thereto for hoisting and lowering of said boom, a load attaching device, an independently operable load hoist drum, a load hoist cable connected to said load hoist drum and said load attaching device and associated with said boom for hoisting and lowering of said load attaching device independently of the boom, a reversible electric driving means for said drums, a differential mechanism having a plurality of driving elements and a common driven element, means for driving said driving elements in fixed relation to the operation of the boom and load hoist drums, and limit switch means for said driving means and driven by said common driven element of said differential mechanism, said limit switch means including contacts for controlling the operation of said driving means to maintain a predetermined distance between said boom and said load attaching device regardless of the hoisted position of said boom.

16. A control system for an electrically operated driving means arranged to drive separately movable elements away from and toward an interfering position with each other, means for selecting the direction of movement of said elements, forward control means for controlling said driving means while said elements are moving toward each other, reverse control means for controlling said driving means while said elements are moving away from each other, a differentially operated limit switch means for controlling said driving means and driven differentially in response to the operated positions of said elements, said limit switch means including contact means associated with said forward control means and operable only while said elements are moving toward said interfering position to stop said driving means, whereby said elements are prevented from reaching said interfering position.

17. A control system for an electrically operated driving means arranged to drive separately movable elements away from and toward an interfering position with each other, electrical control means for said driving means including means for selecting the direction of movement of said elements and for stopping said elements, a differentially operated limit switch means for controlling said driving means and driven differentially in response to the operated positions of said elements, said limit switch means including contact means associated with said control means and operable while said elements are moving toward said interfering position to stop said driving means, whereby said elements are prevented from reaching said interfering position.

18. A control system for an electrically operated driving means arranged to drive separately movable members away from and toward an interfering position with each other, electrical control means for said driving means including means for selecting the direction of movement of said members and for stopping said members, a differential gear having driving elements and a common driven element, means operatively connecting said driving elements to said movable members, respectively, for driving said driving elements in a fixed relation to said movable members, respectively, a limit switch operatively connected to said driven element and driven thereby, said limit switch means including contact means associated with said control means and operable while said members are moving toward said interfering position to stop said driving means, whereby said members are prevented from reaching said interfering position.

PAUL G. WHITE.